(12) United States Patent
Chou

(10) Patent No.: US 6,910,055 B2
(45) Date of Patent: Jun. 21, 2005

(54) CALCULATOR DEVICE FOR ENABLING A KEYPAD TO FUNCTION AS BOTH A KEYPAD AND A CALCULATOR

(75) Inventor: Chin-Wen Chou, Hsin-Tien (TW)

(73) Assignee: Shin-Jiuh Corp., Hsin-Tien (TW)

(*) Notice: Subject to any disclaimer, the term of this patent is extended or adjusted under 35 U.S.C. 154(b) by 617 days.

(21) Appl. No.: 09/941,577

(22) Filed: Aug. 30, 2001

(65) Prior Publication Data

US 2003/0046320 A1 Mar. 6, 2003

(51) Int. Cl.[7] .................................................. G06F 3/00
(52) U.S. Cl. ....................................... 708/142; 345/169
(58) Field of Search ................... 708/142; 345/168–169

(56) References Cited

U.S. PATENT DOCUMENTS

| | | | | |
|---|---|---|---|---|
| 4,891,777 A | * | 1/1990 | Lapeyre | ..................... 708/130 |
| 5,119,078 A | * | 6/1992 | Grant | ......................... 345/172 |
| 5,339,097 A | * | 8/1994 | Grant | ......................... 345/168 |
| 2002/0188437 A1 | * | 12/2002 | Chou | ............................ 704/2 |
| 2003/0112159 A1 | * | 6/2003 | Watanabe et al. | ............. 341/22 |
| 2004/0027334 A1 | * | 2/2004 | Wu et al. | .................... 345/168 |

\* cited by examiner

*Primary Examiner*—Tan V. Mai
(74) *Attorney, Agent, or Firm*—Birch, Stewart, Kolasch & Birch, LLP

(57) ABSTRACT

A calculator device mainly adds an additional calculator device capable of processing numeric data to the circuits of a keypad. When the keypad is linked to a computer, the keypad can be used to enter operation commands to the computer to perform processes desired, also can be switched to calculator function to perform numeric calculation when a switch button key (or switch) on the keypad is depressed.

11 Claims, 4 Drawing Sheets

CALCULATOR DEVICE FOR ENABLING A KEYPAD TO FUNCTION AS BOTH A KEYPAD AND A CALCULATOR

FIELD OF THE INVENTION

The present invention relates to a calculator device and particularly a calculator device that serves a dual function as keypad and a calculator.

BACKGROUND OF THE INVENTION

The commonly used keyboards for notebook computers or conventional keyboards have a sufficient number of button keys when used with general software. However, when new generations of software are loaded into computers for processing, some computer peripheral devices cannot be used and must be replaced. For instance, the upcoming WIN2000 software has about twenty additional hot-key functions when loaded into computers. When the conventional keyboards do not support or execute these twenty hot-key functions, they have to be replaced, or the application will be restricted.

Some producers have developed external connecting keypads to link with personal computers or television sets. The keypads have recorded software for hot-key or Num lock switching. When the hot-key or Num lock button key is depressed, the switching software will automatically switch between the hot-key or Num lock function. Hence every key top on the keypad has printed on it at least two numerals, a notation or a menu for users to select and use.

Although the keypads can offer users many benefits, when doing calculation for drawings or data processing, users still have to prepare another calculator. It is not convenient.

SUMMARY OF THE INVENTION

The primary object of the invention is to resolve the foregoing disadvantages. The invention provides a keypad that includes a calculator function. When users want the calculator function, they only have to depress a switch button key on the keypad, then the keypad will be switched to the calculator function. Thus users can enjoy a lot more convenience.

An other object of the invention is to add a power supply to the keypad so that when the keypad is not connected to the computer, the keypad may still be used as a calculator independently.

To achieve the aforesaid objects, the calculator device of the invention consists of a power supply unit, a power supply detection unit, an input unit, a processing unit, a USB (Universal Serial Bus) connection unit, a first display unit and a second display unit. When the keypad is to be idled temporarily, users may depress the switch button key (or switch) on the keypad to change the function to the calculator function to perform calculations as desired. The calculation results will be displayed on the first display unit. The second display unit can indicate the functional status of the keypad, i.e. whether the keypad is set to a keypad function or a calculator function.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
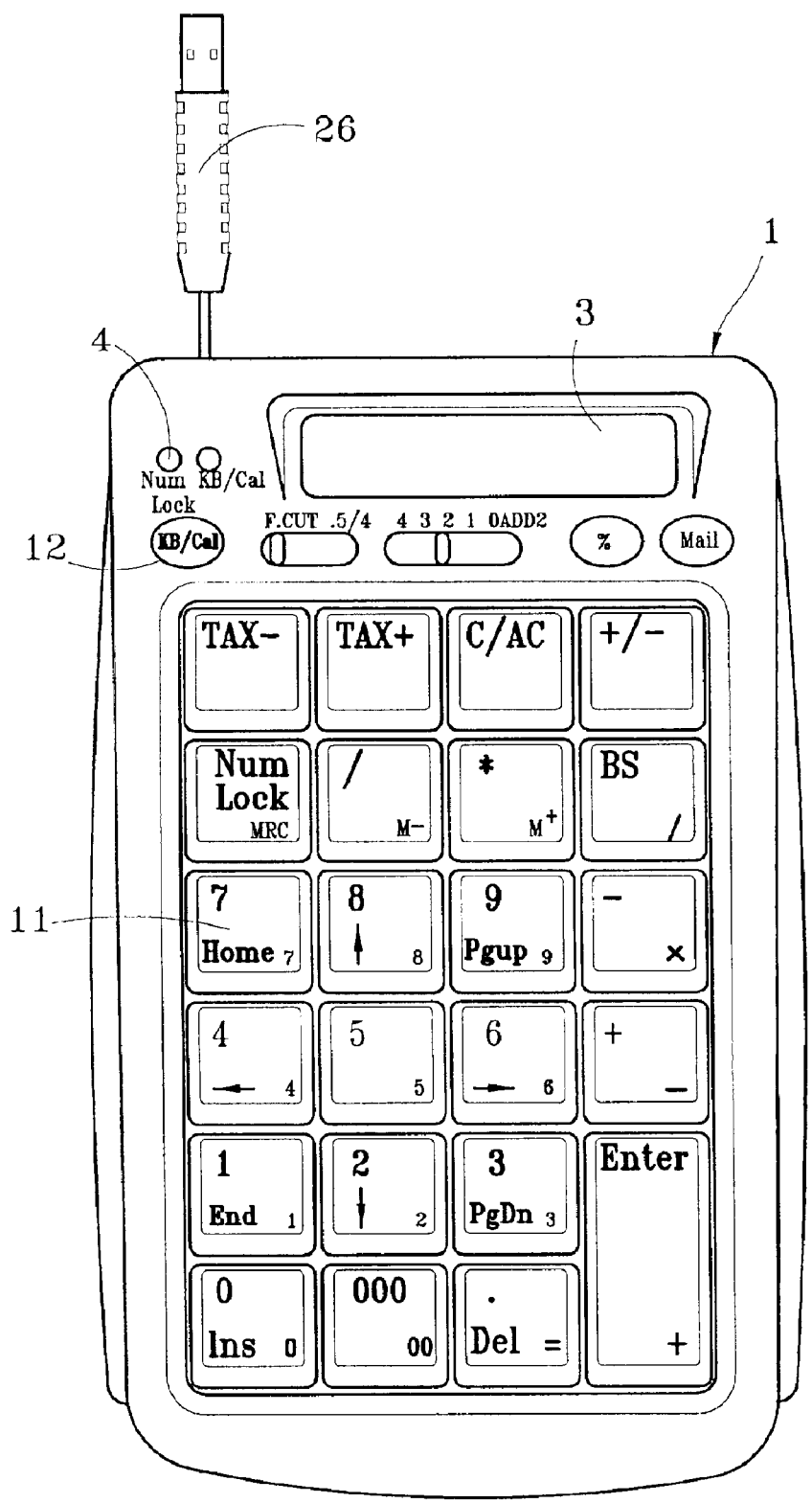
FIG. 1 is a schematic view of the invention function as a calculator device.

Referring to FIG. 1, the invention mainly adds a calculator device 2 to a keypad 1 such that when the keypad 1 is connected to a computer the keypad 1 may function as usual for entering operation commands to the computer, and when the keypad 1 is temporarily not used, users may depress a switch button key 12 (or switch) to switch the keypad to calculator function. Users then can perform numeric calculations and display the processing results on a display unit 3 to enhance users' convenience. The keypad 1 has another display unit 4 to indicate the keypad functional status, i.e. as general keypad function or calculator function.

Figure 2:
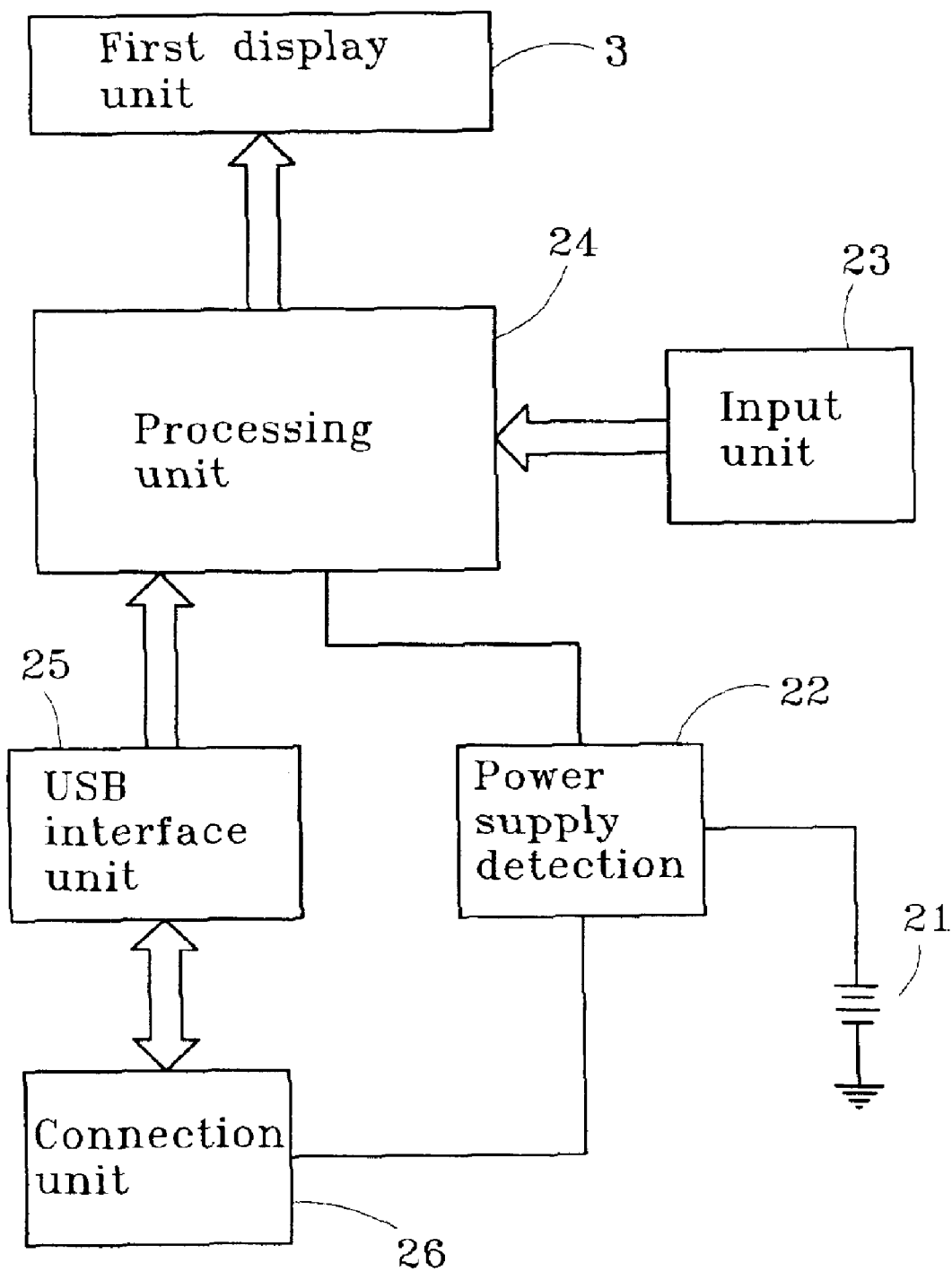
FIG. 2 is a block diagram of the calculator circuit of the invention.
Figure 3:
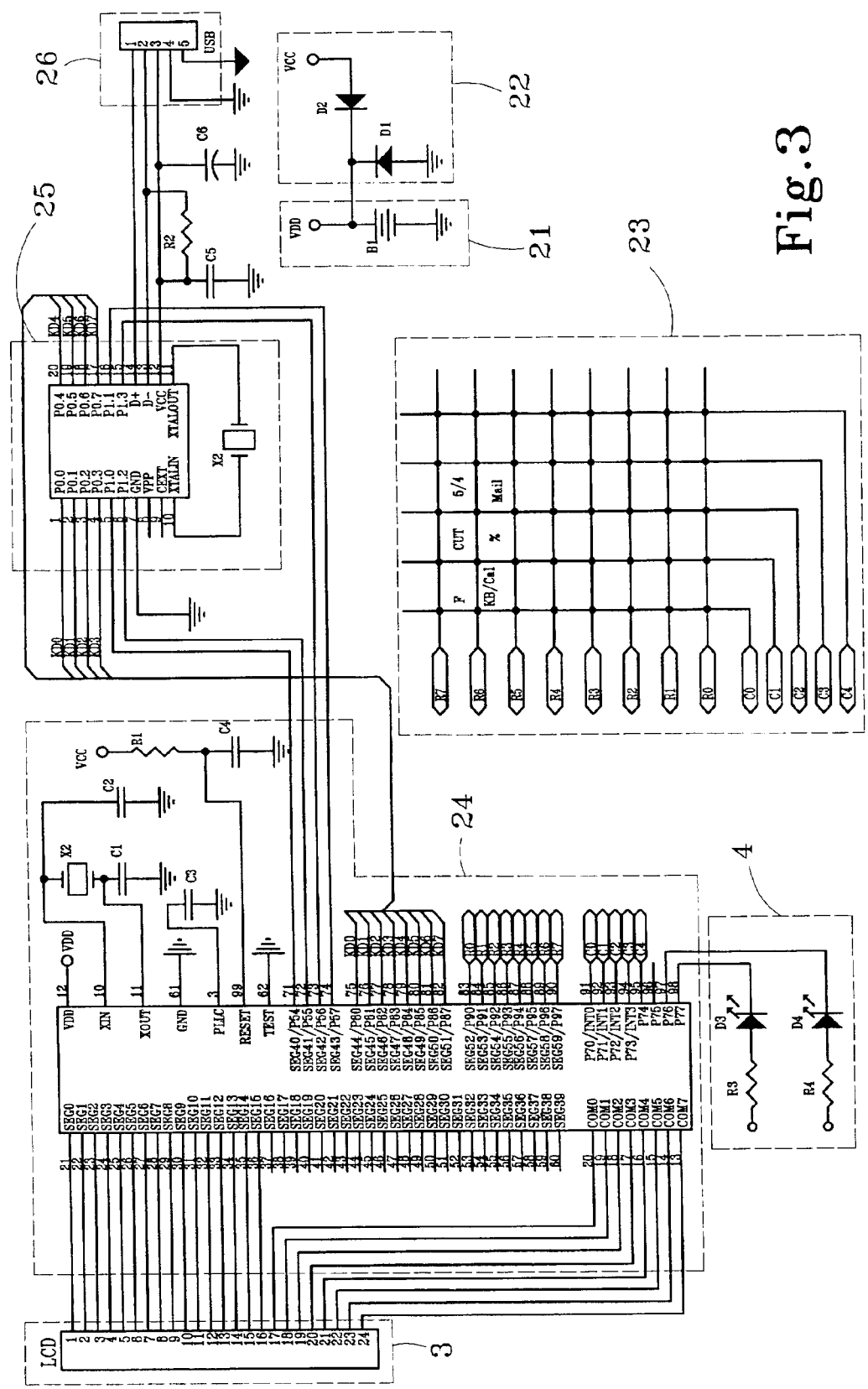
FIG. 3 is a circuit diagram for FIG. 2.

Referring to FIGS. 2 and 3, the calculator device 2 included in the keypad 1 of the invention consists of a power supply unit 21, a power supply detection unit 22, an input unit 23, a processing unit 24, a USB interface unit 25, a USB connection unit 26, a first display unit 3 and a second display unit 4.

The power supply unit 21 includes a battery to provide power source required for the circuits used in the invention.

The power supply detection unit 22 links to the power supply unit 21 to detect whether power supply is provided by the battery or the computer.

The input unit 23 includes button key clusters 11 (as shown in FIG. 1) and a plurality of switch button keys (or switches) 12 on the keypad 1. The button key clusters 11 may be used for commands or numeric operations. Under the control of software, some button keys of the button key clusters 11 may be set for switching calculating functions or conversions. In addition, one of the switch button keys 12 may be set for switching the function of keypad 1 or calculator device 2, and the remaining switch button keys 12 may be used for performing switch or conversion of various calculating functions.

The processing unit 24 connects the input unit 23 and power supply detection unit 22 to receive signals output from the input device 23 and signals detected by the power supply detection unit 22 to perform calculation or determination.

The USB interface unit 25 links to the processing unit 24 for transmitting calculated or processed signals from the processing unit 24 to a PC (personal computer) for further processing.

The USB connection unit 26 bridges the USB interface unit 25 and the PC for transmitting output signals from the processing unit 24 to the PC, or receiving power supply transmitted from the PC.

The first display unit 3 connects the processing unit 24 for displaying resulting data or numerals processed by the processing unit 24.

The second display unit 4 is a light bulb or light emitting diode linking to the processing unit 24 to receive signals output from the processing unit 24 for indicating functional status of the keypad 1 or the calculator device 2.

Figure 4:
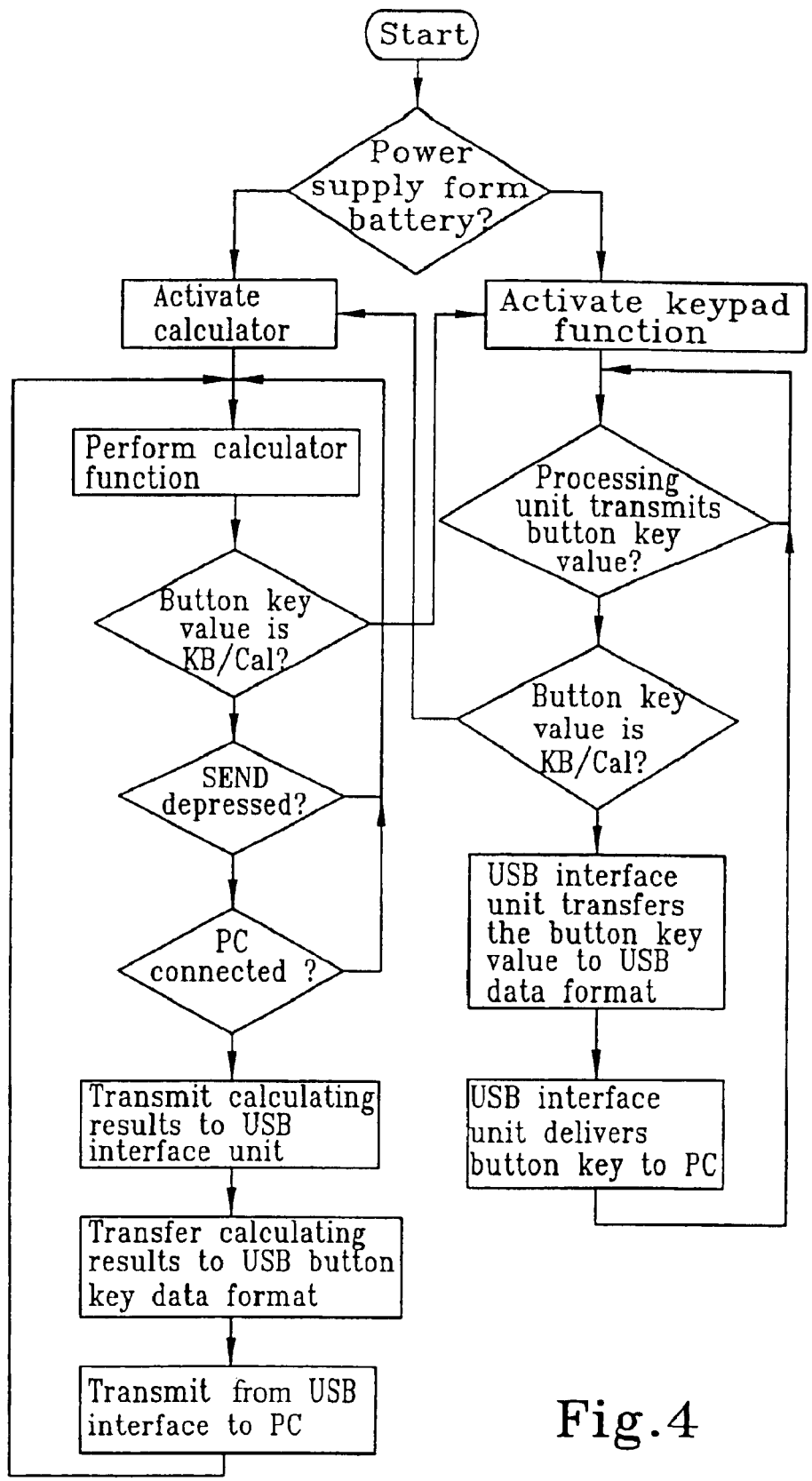
FIG. 4 is a software control process flow of the invention.

Referring to FIG. 4 for the software processing flow of the invention, when the software is initiated for operation, first, determine whether power is being supplied by the battery. If the outcome is positive, activate the calculator and perform a calculator function. Then determine if the depressing button key value is KB/Cal. If positive, go to the activating keypad function; if negative (not KB/Cal), determine if the SEND button key is depressed. If the SEND button key is not depressed, branch to processing the calculator function; if the SEND button key is depressed, determine if a link to the PC is present. If negative (no PC), go to the calculator function; if positive (linked to PC), transmit calculation results to the USB interface unit and convert the calculation results to USB button key data format, and send the data through the USB interface unit to the PC, then return to perform a calculator function.

In the foregoing processes, when no power supply is detected from the battery, activate the keypad function, then determine if the button key value has been sent by the processing unit. If negative, go to activating the keypad function; if positive (keypad button key), determine if the button key value is KB/Cal. If positive (is KB/Cal.), go to activating the calculator; if negative (not KB/Cal.), the USB interface unit transfers the button key value to a USB data format and sends the button key to the PC. Thus the switching between the keypad function and the calculator function is completed.

What is claimed is:

1. A calculator device for enabling the keypad to perform a numeric calculation function by processing numeric calculations in addition to performing a keypad operation function of supplying input operation commands and numeric data to a computer, the calculator device comprising:
    a power supply detection unit for detecting whether power is supplied by a power supply source of the calculator device or by the computer;
    a processing unit connected to the power supply detection unit for receiving signals from the power supply detection unit and for performing said numerical calculations on numeric data;
    an input unit linked to the processing unit for entering said operation commands or said numeric data to the processing unit; and
    a universal serial bus (USB) interface unit connecting the processing unit and a computer;
    wherein the input unit is arranged to be depressed to allow users to switch between said keypad operation function of the keypad and said numeric calculation function of the calculating device.

2. The calculator device of claim 1 further having a power supply unit.

3. The calculator device of claim 2, wherein the power supply unit is a battery.

4. The calculator device of claim 1, wherein the input unit includes button key clusters and a plurality of switch button keys or switches located on the keypad.

5. The calculator device of claim 4, wherein the button key clusters are used to perform commands input or numeric operations, and selected button keys of the button key clusters are allowed to switch between performing the calculating function or conversions under software control.

6. The calculator device of claim 4, wherein one of the switch button keys performs a switch function for switching between the keypad and the calculator device, the rest of the switch button keys being set for performing switching or conversions of the calculating function.

7. The calculator device of claim 1, further comprising a first display unit for displaying calculation results of the processing unit.

8. The calculator device of claim 1, further comprising a second display unit for displaying the status of the keypad and the calculator device.

9. The calculator device of claim 8, wherein the second display unit is selectively a light bulb or a light emitting diode.

10. The calculator device of claim 1, wherein if a link to the computer is detected, the processing unit sends numerical calculation results to the computer via said link.

11. The calculator device of claim 1, wherein, upon determining that power is supplied by a power supply source, said processing unit activates a numeric calculation function of the calculating device and, upon determining that no power is supplied by the battery, said processing unit activates a keypad function.

* * * * *